I. BENHAM.
Balance Scale.
No. 70,942. Patented Nov. 19, 1867.
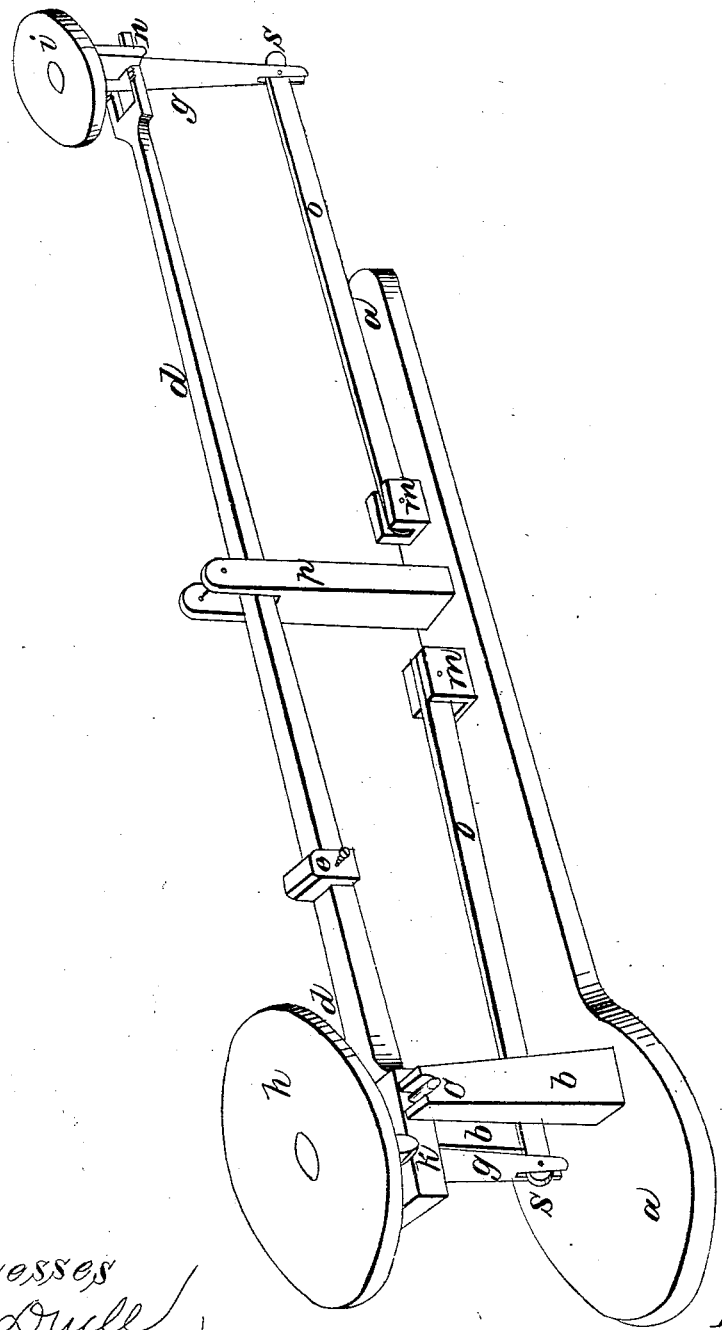
Witnesses
Inventor.

United States Patent Office.

ISAAC BENHAM, OF McLEAN, NEW YORK, ASSIGNOR TO HIMSELF AND ALLEN B. BENHAM, OF SAME PLACE.

Letters Patent No. 70,942, dated November 19, 1867

IMPROVEMENT IN SCALES.

*The Schedule referred to in these Letters Patent and making part of the same.*

TO ALL WHOM IT MAY CONCERN:

Be it known that I, ISAAC BENHAM, of McLean, in the county of Tompkins, and State of New York, have invented a new and useful Improvement or Device, being a Proportioning-Scale or Measurer.

For instance, in the manufacture of butter it is claimed that each pound of butter should have one ounce of salt. To ascertain the quantity of salt needed, therefore, the butter must first be weighed and a calculation made, and then the salt weighed, before the operator is prepared to put the two together.

My invention is intended to be used in this and all like operations, where different ingredients are to be mingled in definite proportions, to economize in time and by obviating the necessity of using weights.

And I do hereby declare that the following is a full, clear, and exact description of the construction and operation of said improvement, reference being had to the annexed drawings, making a part of this specification, and which is a perspective view of the apparatus.

$a\ a$ is a platform upon which are erected the posts $b\ b$. Across the tops of these is pivoted, at $c$, the bar or lever $d\ d$. The long arm of this lever should be about sixteen times the length of the short arm. Upon this lever, at the points $k$ and $n$, rest upon pivots the platforms $h$ and $i$, each of them being provided with a stem, $g\ g$, projecting downwards, and hinged at $s\ s$ to the guide-bars $o\ o$, which, in turn, are hinged to the blocks $m\ m$. These projecting stems and their attachments $o\ o$ are for the purpose of keeping the platforms level at all times, and yet free to move vertically. $e$ is a balancing-weight, held at any desired point on the lever $d$ by a thumb-screw. The standard $p$ has a slot in which the lever $d$ may play, but by which its movements are limited.

In using this device for butter-making, the platforms $h$ and $i$ being adjusted so that $i$ is sixteen times the distance $h$ is from the pivot $k$, the butter-bowl is placed upon the platform $h$ and the salt-dish upon $i$, and the scale then balanced by means of the weight $e$. The churning of fresh butter then being placed in the bowl, the salt-dish is filled until it balances the bowl, and, of necessity, there is sixteen times the weight of butter that there is of salt, however large or small the churning. In other words, the butter weighs out its needed quantity of salt for itself, and without the use of any other weight than itself. By placing the platform $i$ nearer to or farther from the pivot $k$, the proportion of salt to the pound of butter is of course increased or diminished.

What I claim, and desire to secure by Letters Patent, is—

A proportioning-scale for ascertaining, in compounds of ingredients in fixed proportions, the quantity of any one ingredient, by the use of any other ingredient as a weight or measure, in the manner and by the device above set forth, as a new article of manufacture.

ISAAC BENHAM.

Witnesses:
R. H. DUELL,
J. H. PALMER.